US005668317A

United States Patent [19]
Farine et al.

[11] Patent Number: 5,668,317
[45] Date of Patent: Sep. 16, 1997

[54] DEVICE AND METHOD FOR MEASURING AN ANGULAR SPEED

[75] Inventors: Pierre-André Farine, Neuchâtel; Jean-Daniel Etienne, Les Geneveys-sur-Coffrane; Silvio Dalla Piazza, St-Imier, all of Switzerland

[73] Assignee: Asulab S.A., Bienne, Switzerland

[21] Appl. No.: 663,928

[22] Filed: Jun. 14, 1996

[30] Foreign Application Priority Data

Jun. 21, 1995 [FR] France .................... 95 07417

[51] Int. Cl.$^6$ .................................................. G01P 9/04
[52] U.S. Cl. ............................................. 73/497; 73/504.16
[58] Field of Search .......................... 73/504.05, 504.16, 73/497, 514.15, 514.29

[56] References Cited

U.S. PATENT DOCUMENTS

| | | | |
|---|---|---|---|
| 4,930,351 | 6/1990 | Macy et al. | 73/504.04 |
| 5,481,914 | 1/1996 | Ward | 73/504.16 |

FOREIGN PATENT DOCUMENTS

| | | |
|---|---|---|
| 0 494 588 | 7/1992 | European Pat. Off. . |
| 0 503 807 | 9/1992 | European Pat. Off. . |
| 0 515 981 | 12/1992 | European Pat. Off. . |

*Primary Examiner*—Christine K. Oda
*Attorney, Agent, or Firm*—Griffin, Butler, Whisenhunt & Kurtossy

[57] ABSTRACT

An angular speed measuring device includes an oscillator for producing an excitation signal which induces mechanical vibrations in a rotating tuning fork, and an analog processing circuit for processing an electrical detection signal derived from the tuning fork. The analog processing circuit comprises a temperature-independent phase shifter responsive to the excitation signal for producing two signals in quadrature. The quadrature signals are applied to two multipliers which also receive the detection signal. The output signals from the multipliers are dependent on the fixed phase shift $\phi$ between the excitation signal and the detection signal, which is fixed for a given tuning fork, and on the variable phase shift $\psi$ which is a function of the rotational speed of the tuning fork, but the multiplier output signals are independent of temperature. After A/D conversion, the multiplier output signals are processed in a microprocessor to determine the angular speed.

15 Claims, 3 Drawing Sheets

DEVICE AND METHOD FOR MEASURING AN ANGULAR SPEED

FIELD OF THE INVENTION

The present invention concerns an angular speed measuring device comprising:

a transducer intended to rotate at said angular speed;

means for generating a mechanical vibration of said transducer in response to an excitation signal, said mechanical vibration comprising a parasite component, and at least one useful component having an amplitude which is representative of said angular speed;

means for producing an electric detection signal representative of said mechanical vibration and also comprising a parasite component and at least one useful component having an amplitude which is representative of said angular speed.

The invention further concerns a method of processing excitation and detection signals for facilitating the measurement of the useful component of the detection signal, by increasing the resolution of the measurement and by rendering it independent of variations of the operation temperature.

The invention applies in particular to the determination of the useful component of the electric detection signal provided by a tuning fork gyrometer in response to an excitation signal, due to the Coriolis force acting on the tuning fork.

BACKGROUND OF THE INVENTION

Tuning fork gyrometers have a tendency of imposing themselves for the determination of the angular speed of a moving object, due to their small dimensions and their low costs. Complex and expensive gyroscopes have been used for a long time, in particular in aeroplanes or missiles, where they are used to follow the orientation of the aeroplane or the missile with respect to a fixed reference.

But, with possibilities of miniaturisation connected to the tuning fork gyroscope, new applications are contemplated, in particular in the field of automobiles, where they may be integrated into anti-skidding devices or devices for equilibrium correction.

An angular speed measuring device using a quartz tuning fork has been described in detail in the patent EP-B-0 515 981, of the same applicant. In a quartz tuning fork gyrometer, the arms of the tuning fork are provided with electrodes for applying an excitation signal, and with electrodes for detecting a detection signal which corresponds to the response of the tuning fork during its rotation around its longitudinal axis.

Certain documents of the state of the art, in particular the document EP 0 494 588, assume that the correct operation of a tuning fork gyrometer depends, on the one hand, on the implementation of the excitation and the detection electrodes on the tuning fork, allowing to minimise the coupling between the excitation signal and the detection signal, and on the other hand, on the quality of the electronic processing means associated to the tuning fork so as to fully exploit the useful component, typically very small, due to the Coriolis force during the movement of the gyrometer.

However, known tuning fork gyrometers are, in the present state of the art, penalised by the difficulty to measure the useful part of the detected signal corresponding to the Coriolis force, this being all the more true when the rotational speed of the gyrometer is low. Furthermore, certain components or analog devices used in the assembly for measuring the useful component of the detection signal, introduce into this component a factor depending on the effect of the temperature. Due to this fact, they render the useful component of the detection signal dependent on the temperature, while for an optimal measurement, the useful component should depend only on the angular speed.

SUMMARY OF THE INVENTION

The present invention has as its aim to remedy these inconveniences, by proposing an angular speed measuring device based on the use of the Coriolis force allowing to isolate and to determine with a sufficient resolution the useful component of the detection signal provided by the transducer.

Another aim of the invention is to propose an angular speed measuring device of the type described hereabove, allowing to provide a measurement signal of the detected useful signal which is independent of the operation temperature.

To this effect, the invention has as its object an angular speed measuring device comprising:

a transducer intended to rotate at said angular speed;

means for generating a mechanical vibration of said transducer in response to an excitation signal, said mechanical vibration comprising a parasite component, and at least one useful component having an amplitude which is representative of said angular speed, means for producing an electric detection signal representative of said mechanical vibration and also comprising a parasite component and at least one useful component having an amplitude which is representative of said angular speed, characterized in that the device comprises analog processing means of the detection and of the excitation signal comprising:

two identical analog multipliers having a same temperature behaviour;

a phase-shift circuit of exactly 90°; said analog processing means being arranged so as to provide at least one analog measurement signal which depends only on said useful component of the electric detection signal, thereby being practically independent of the operation temperature of the device.

According to other features of the invention:

the 90° phase-shifting circuit is capable of producing in response to an input signal, two output signals which are exactly in phase-quadrature, whatever may be the operation temperature of said phase-shifting circuit. This 90° phase-shifting circuit has connected to its input the excitation signal of the transducer, and comprises a first output connected to an input of a first of said analog multipliers and a second output connected to an input of a second of said analog multipliers, the other input of said multipliers being fed by the detection signal, so as to produce at the output of the respective multipliers analog signals which are dependent on the useful component of the detection signal, thereby being practically independent of the operation temperature of the device.

Advantageously, the 90° phase-shifting circuit comprises two frequency division circuits connected in parallel and having a same temperature behaviour, but of which one reacts to a leading edge, and the other reacts to a trailing edge, the two frequency dividers being fed by a same signal derived from the excitation signal.

The invention further concerns a method of measuring the angular speed associated to the device mentioned hereabove as defined in the claims.

The objects and features of the invention will be described more in detail hereafter and by way of a nonlimitative example with reference to the drawings in which:

DESCRIPTION OF PREFERRED EMBODIMENT

Figure 1A:
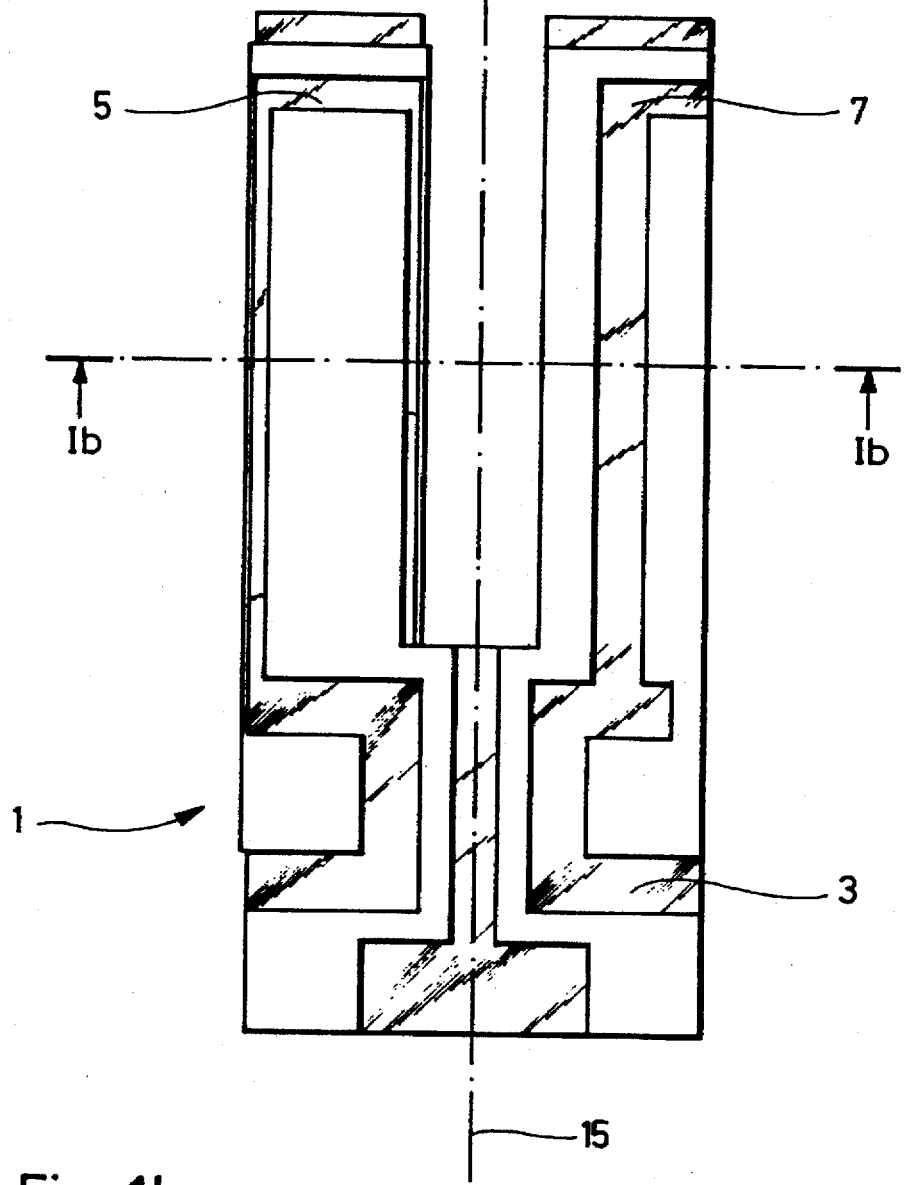
FIG. 1A shows a longitudinal cross-sectional view of a tuning fork such as that used in certain gyrometers.
Figure 1B:
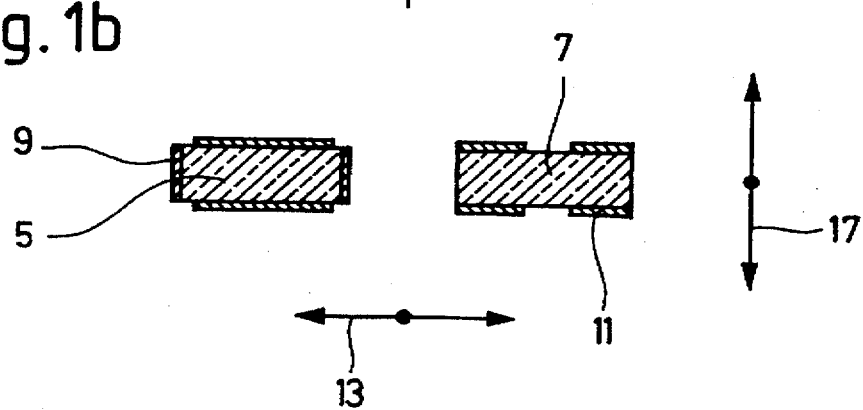
FIG. 1B is a transversal cross-sectional view I—I of the excitation arm (E) and the detection arm (D) of the tuning fork of FIG. 1A.

Reference will now be made to FIG. 1. In this figure an example of a tuning fork 1 of the type used in gyrometers has been represented. Tuning fork 1 is represented in a longitudinal cross-section in FIG. 1A comprising principally a base 3 fixedly connected to two arms 5, 7, the assembly being manufactured of a quartz piezoelectric material. As has been represented by a transversal cross-section view according to FIG. 1B, each arm 5, 7 comprises electrodes 9, 11. The excitation arm (E) 5 comprises excitation electrodes 9, only one of the four electrodes represented having been referenced, allowing the application of an electric signal ±V which allows to excite, and as a consequence allows to mechanically vibrate the arms 5, 7 of tuning fork 1 in a first plane, as indicated by the arrows 13. The detection arm (D) 7 comprises detection electrodes 11, only one of the four electrodes represented having been referenced, which allow to transform the mechanical vibrations of the detection arm into an electric detected signal.

According to the theory of tuning fork gyrometers, an angular rotational movement of tuning fork 1 around its longitudinal axis 15 during which an excitation signal is applied to the excitation electrode (E) 9, generates a Coriolis force perpendicular to the excitation, and as a consequence a vibration of at least the detection arm (D) 7 in a plane perpendicular to the plane corresponding to the excitation vibration, as indicated to the arrow 17.

This mechanical vibration is transformed by the piezoelectric quartz of tuning fork 1 into an electric signal which is detected by the detection electrodes 7 of tuning fork 1.

As a simplification of the considerations which will follow, it will be assumed that the excitation signal (OSC) is sinusoidal, and that the detection signal (DET) corresponds to the superposition of a parasite component and of a useful component corresponding to the Coriolis force, phase-shifted about an angle $\phi_0$ with respect to the excitation signal. Under these conditions, the signals OSC and DET satisfy the following equations:

$$OSC = A \cdot \cos(\omega_0 t + \phi_0), \quad (1)$$

in which A is the amplitude of the excitation signal, $\omega_0$ is its pulsation and $\omega_0$ is its initial phase-shift with respect to the detection signal, and:

$$DET = B \cdot \cos(\omega_0 t) + C \cdot \sin(\omega_0 t), \quad (2)$$

in which the first term represents a parasite signal caused by the capacitive mechanical coupling between the arms of the tuning fork and the second term represents the useful signal which is caused by the Coriolis force, its amplitude C being the amplitude to be measured, and which is proportional to the rotational speed $\Omega$ of the tuning fork.

It should further be noted that the phase-shift $\omega_0$ between the excitation signal OSC and the detection signal DET, is constant for a given tuning fork, and is typically around 56° for a tuning fork such as the one represented in FIG. 1.

The detection signal DET appears as a phase modulated signal, which can be defined according to the following equation:

$$DET = \sqrt{(B^2 + C^2)} \cdot \sin\phi(t), \quad (3)$$

In practice, it has been noted that the amplitude C of the useful component of the detection signal is much smaller, for rotational speeds $\Omega$ which are around 50°/s, than the amplitude B of the parasite coupling component, so that the ratio C/B is typically around 1/50, which corresponds to a phase-shift angle C which is very small, around 1°, and which is difficult to measure and to be used for determining the rotational speed $\Omega$ of tuning fork 1, especially in case a temperature effect on certain components intervening in the amplification or the processing of the detection signal must be taken into consideration.

The present invention concerns a method of electronic processing the electric excitation and detection signals, and concerns means which are associated to this, so as to isolate and measure, without any effect of the temperature, the useful component of the detection signal, i.e. that component which is due to the Coriolis force, as clearly put forward hereabove.

Figure 2:
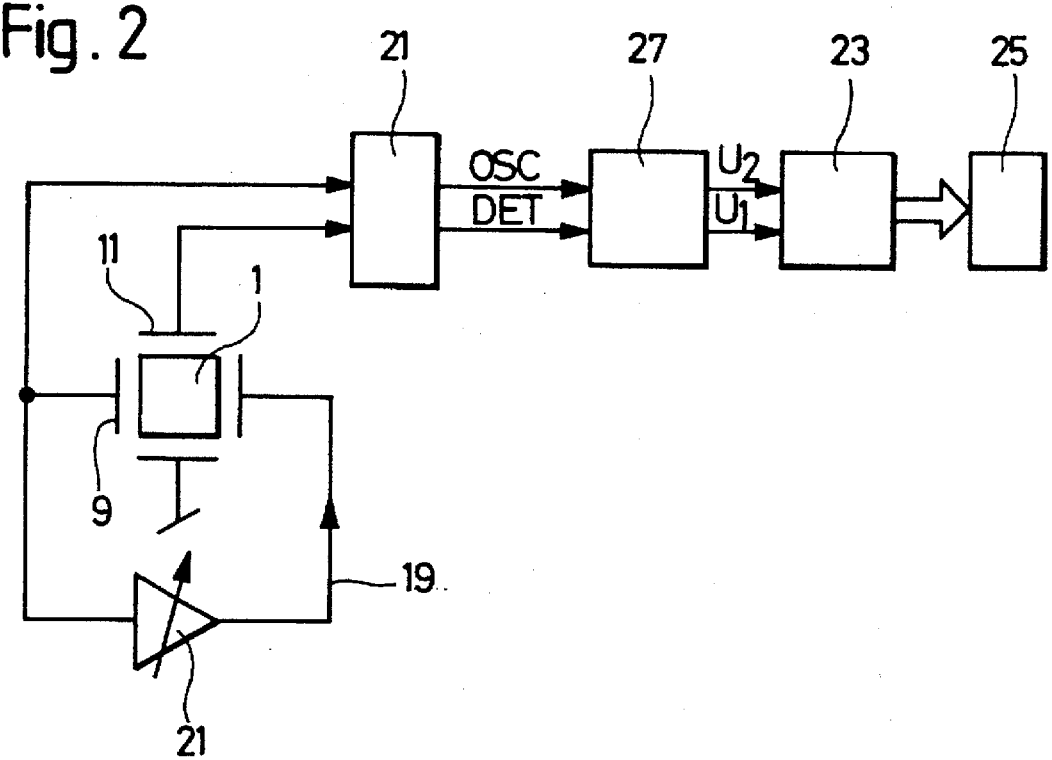
FIG. 2 is a schematic view of the angular speed measuring device according to the invention.

To this effect, reference will be made to FIG. 2, in which is represented in a schematical way a tuning fork according to that of FIG. 1, associated to electronic processing circuits of the excitation signal and of the detection signal.

In a manner known as such, the excitation electrodes 9 of tuning fork 1, are integrated into a resonance circuit shown schematically by a loop 19 and being supplied by a continuous current by an amplifier 21, and the detection signal DET being measured at the terminals of the detection electrodes 11 of tuning fork 1.

A known method for measuring the phase-shift $\psi$ consists of forming a phase- and phase-quadrature demodulation, or I-Q, of the excitation and of the detection signals. According to this method, the excitation signal OSC and the detection signal DET are firstly amplified and then put into phase-quadrature. For this, these signals undergo a phase-shifting of $(\pi/2 - \omega_0)$ by way of all-pass filters, which react differently to the influence of the temperature. The amplification stage and the phase-shift used to this effect are known as such and are represented in a schematical way by block 21 in FIG. 2. Because of the effect of temperature variations on the analog stage 21, it is necessary to provide means for eliminating or for at least compensating this temperature effect, so as to produce a measurement signal of the angular speed of the tuning fork which will not be drowned in the fluctuations due to the temperature differences created.

To this effect, the signals OSC and DET pass through an analog processing circuit 27 according to the invention, which will be explained in detail further on. The signals $U_1$, $U_2$ which are outputted by circuit 27 are independent of the temperature and are transmitted in a known manner to an analog-digital conversion circuit 23. This latter generates, by sampling the signals $U_1$, $U_2$, digital samples which are independent of the temperature, but which are representative of the useful component of the detection signal. These samples are transmitted to a microprocessor 25 for deducting the angular speed of the tuning fork.

Figure 3:
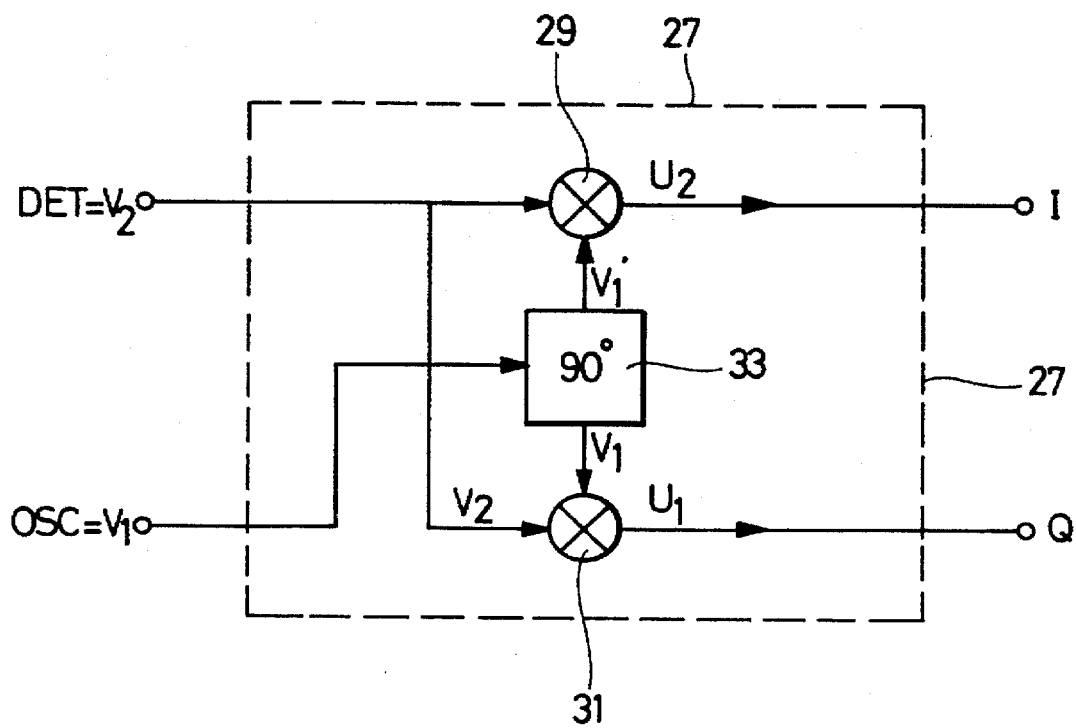
FIG. 3 is a block diagram of an analog processing circuit allowing to render the measurement signal independent of the temperature.

Reference will now be made to FIG. 3, in which the structure of the analog processing circuit 27 is represented more in detail. This circuit comprises two identical mixers 29, 31, and a phase-shifting circuit 33 capable of producing from an input signal $V_1$ which is chosen as being the excitation signal OSC, two output signals $V_1$, $V_1'$ phase-shifted by a fixed phase-shift of exactly 90°. According to the invention, the detection signal DET=$V_2$ is used to drive in parallel an input of each of the two mixers 29, 31 while at the same time the other input of these mixers 29, 31 are respectively driven by the quadrature signals $V_1'$ and $V_1$. At the output of the mixer 29, the signal $U_2(t)=V_1' \cdot V_2$=OSC'·DET, is obtained and at the output of mixer 31, the signal $U_1(t)=V_1 \cdot V_2$=OSC ·DET is obtained.

With the definition of the signal OSC according to equation (1) hereabove, and under the condition that the signal OSC'=$V_1'$ is exactly phase-shifted by 90° with respect to the signal OSC, the following expression may be obtained for the signal OSC':

$$OSC'=A \cdot \cos(\overline{\omega}_0 t + \phi_0), \quad (4)$$

and thus, for the signal $U_1$ and $U_2$ at the output of the analog processing circuit 27, and after passing through the usual low-pass filters at the input of the analog-digital converter, the following expressions:

$$U_1(t)=V_1 \cdot V_2=AB/2 \cdot \cos\phi - AC/2 \cdot \sin\phi \quad (5)$$

$$U_2(t)=V_1 \cdot V_2=AB/2 \cdot \sin\phi + AC/2 \cdot \cos\phi \quad (6)$$

$U_1(t)$ and $U_2(t)$ are thus of the form:

$$A/2 \cdot \sqrt{(B^2+C^2)} \cdot \cos(\phi+\psi) \text{ and}$$

$$A/2 \cdot \sqrt{(B^2+C^2)} \cdot \sin(\phi+\psi)$$

respectively in which $\psi$ represents the phase-shift due to the Coriolis force, and which can be expressed by $\psi$=arc tan C/B. This phase-shift is thus determined from the instantaneous value of $U_1(t)$ and $U_2(t)$ by the analog-digital converter 23 followed by the microprocessor 25, as indicated hereabove. It is important to know that thanks to the analog processing effectuated by the processing circuit 27, $U_1(t)$ and $U_2(t)$ only depend on, on the one hand, the initial phase-shift $\phi$ between the excitation signal OSC and the detection signal DET, which is fixed for a given tuning fork, and on the other hand, on the variable phase-shift $\psi$ which is a function of the rotational speed of the tuning fork, and which is the one to be determined. But, concerning the electronic part of the system, neither $U_1(t)$ nor $U_2(t)$ still depend on the effect of the temperature, at least the one with respect to the other, so that the measurement of the angular speed of the tuning fork may be performed with a higher precision.

Figure 4:
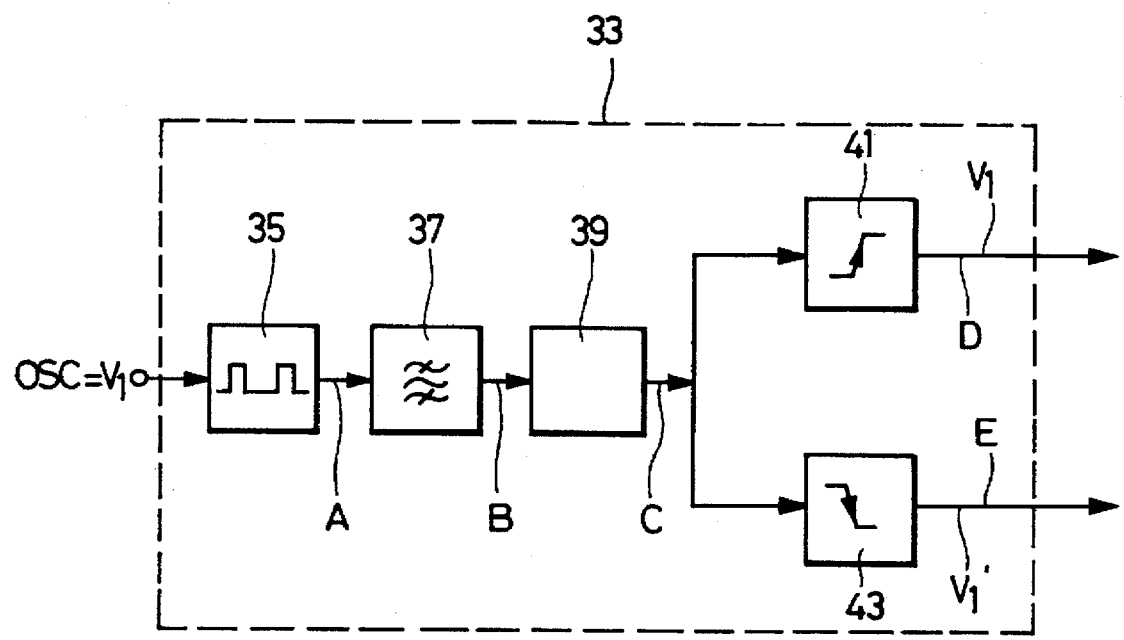
FIG. 4 is a block diagram of an example of a realisation of the 90° phase-shifting circuit of FIG. 3.

In FIG. 4 an example of a more detailed embodiment of the fixed phase-shifting circuit 33 has been represented corresponding to the one represented schematically in FIG. 3. According to this embodiment, phase-shifting circuit 33 comprises a monostable 35 to which is fed a sinusoidal excitation signal OSC. Monostable 35 is chosen so as to generate a rectangular signal of a relatively short cycle, around 10 to 20%, so that its output signal A comprises several harmonics. Thus, by supposing that excitation signal OSC presents a frequency of 8 kHz, monostable 35 produces a rectangular signal A (see FIG. 5A) of the same frequency, and produces a certain number of harmonics at multiple frequencies of 8 kHz.

Monostable 35 is thus followed by a band-pass filter, which may be adjusted for example to the third harmonic produced by monostable 35, i.e. to a frequency of 32 kHz in this example. The band-pass filter 37 produces a rectangular signal B (FIG. 5B) at 32 kHz, which drives a frequency divider by two 39. This divider produces a rectangular signal C (FIG. 5C) at a frequency of 16 kHz.

Figure 5:
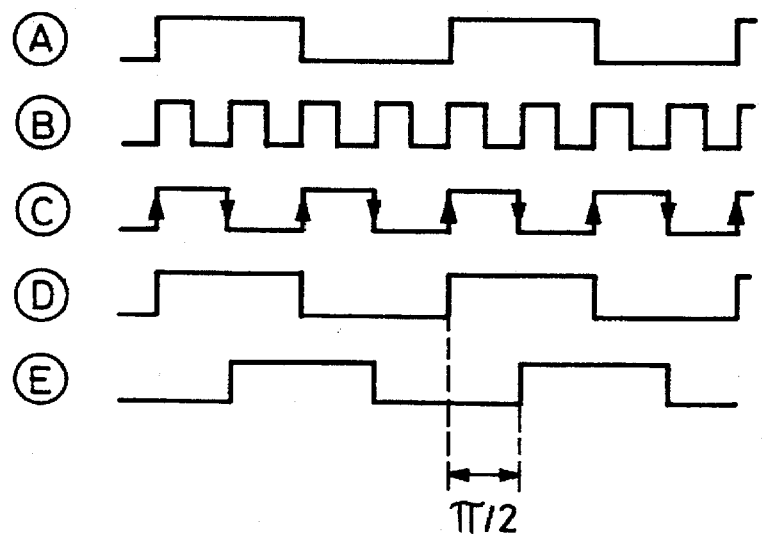
FIG. 5 is a time diagram representing the signals used in the circuit of FIG. 4.

The output of the frequency divider 39 is connected in parallel to the inputs of two other identical frequency dividers 41, 43, but of which the first is controlled by the leading edge of signal C, and the second of which is controlled by the trailing edge of signal C. As such, at the output of frequency dividers 41, 43 signals D, E are obtained respectively (FIGS. 5D and 5E). These signals D, E correspond to the excitation signal OSC and to the signal OSC' which is phase-shifted by exactly 90° with respect to OSC, independently of the operation temperature.

The use of signals OSC and OSC' phase-shifted by 90° for respectively driving mixers 31, 29 as explained in relation to FIG. 3, allows to obtain the output signals $U_1$, $U_2$ which are independent of the temperature. In fact, as mixers 29, 31 are identical, they undergo the same influence of the temperature. As a consequence, signals $U_1$ and $U_2$ remain phase-shifted by (90°+$\psi$), which thus allows to demodulate $\psi$ with the help of an analog-digital converter 23 followed by microprocessor 25.

With respect to this, it may be noted that in the case in which the initial phase-shift $\psi$ is equal to 56° and in which the desired resolution is 0.005°, the output of the analog-digital converter 23 must define about 11,200 digital values (56°/0.005). To obtain such a resolution, the converter must thus perform a 14 bits coding ($2^{14}$=16,384).

It results from the above that the angular speed measuring device according to the invention responds to the aim as determined, by allowing to provide with a high resolution an output signal which only depends on the useful component of the detection signal, thereby eliminating the influence of the temperature on the device.

What is claimed is:

1. An angular speed measuring device for measuring angular speed, said device comprising:

means for generating a mechanical vibration of said transducer in response to an excitation signal, said mechanical vibration comprising a parasite component and at least one useful component having an amplitude which is representative of said angular speed;

means for producing an electric detection signal representative of said mechanical vibration and also comprising a parasite component and at least one useful component having an amplitude which is representative of said angular speed;

wherein the device further comprises analog processing means of the detection signal and of the excitation signal comprising:

two identical analog multipliers having a same temperature behavior;

a phase-shifting circuit of exactly 90°, said analog processing means providing at least one analog measurement signal which depends only on the useful component of the electric detection signal, thereby being practically independent of the operation temperature of the device.

2. A device according to claim 1, wherein said transducer is a quartz tuning fork.

3. A device according to claim 1, wherein said 90° phase-shifting circuit produces from an input signal, two output signals which are exactly in quadrature, independently of the operation temperature of said phase-shifting circuit.

4. A device according to claim 3, wherein said 90° phase-shifting circuit has an input connected to the excitation signal of the transducer, and comprises a first output connected to an input of a first of said analog multipliers and a second output connected to an input of a second of said analog multipliers, the other inputs of said multipliers being fed by the detection signal, in such a way so as to produce at the respective outputs of said multipliers, analog signals which depend on the useful component of the detection signal, and which are practically independent of the operation temperature of the device.

5. A device according to claim 4, wherein said 90° phase-shifting circuit comprises two frequency dividing circuits connected in parallel and having a same temperature behavior, a first of said dividing circuits reacting to a leading edge and a second of said dividing circuits reacting to a trailing edge, said two dividers being fed by a same signal C derived from the excitation signal.

6. A device according to claim 5, wherein said 90° phase-shifting circuit comprises a monostable fed by the excitation signal and providing a rectangular signal, the output of said monostable being connected to the input of a band-pass filter which passes the third harmonic of said rectangular signal, the output of said band-pass filter being connected to the input of a division-by-two circuit, the output of which is connected to said first and second dividing circuits which are identical and are connected in parallel, so that said identical dividing circuits provide signals at their outputs which are of the same frequency as the excitation signal, and which are phase-quadratured one with respect to the other, independently of the operation temperature.

7. A device according to claim 6, wherein said monostable provides at its output a rectangular signal having a time cycle which is around 10 to 20%.

8. A device according to claim 1, wherein said analog processing means has outputs connected to an input of an analog-digital converter, in particular a 14 bit analog-digital converter, said analog-digital converter having an output connected to a data input of a microprocessor in which the digital values of the angular speed of the transducer are calculated.

9. A device according to claim 3, wherein said analog processing means has outputs connected to an input of an analog-digital converter, in particular a 14 bit analog-digital converter, said analog digital converter having an output connected to a data input of a microprocessor in which the digital values of the angular speed of the transducer are calculated.

10. A device according to claim 4, wherein said analog processing means has outputs connected to an input of an analog-digital converter, in particular a 14 bit analog-digital converter, said analog digital converter having an output connected to a data input of a microprocessor in which the digital values of the angular speed of the transducer are calculated.

11. A device according to claim 5, wherein said analog processing means has outputs connected to an input of an analog-digital converter, in particular a 14 bit analog-digital converter, said analog digital converter having an output connected to a data input of a microprocessor in which the digital values of the angular speed of the transducer are calculated.

12. A device according to claim 6, wherein said analog processing means has outputs connected to input of an analog-digital converter, in particular a 14 bit analog-digital converter, said analog digital converter having an output connected to a data input of a microprocessor in which the digital values of the angular speed of the transducer are calculated.

13. A device according to claim 7, wherein said analog processing means has outputs connected to an input of an analog-digital converter, in particular a 14 bit analog-digital converter, said analog digital converter having an output connected to a data input of a microprocessor in which the digital values of the angular speed of the transducer are calculated.

14. A method for measuring the angular speed of a transducer undergoing a Coriolis force caused by its angular movement, comprising the following steps:

applying an electric excitation signal to the transducer to cause the transducer to produce a detection signal comprising a useful component representative of the angular speed of the transducer, and a parasite component, and detecting said detection signal;

the method further comprising the following steps:

applying said excitation signal and/or said detection signal to an analog processor which eliminates influence of the operation temperature of the transducer from a detection signal and/or from the excitation signal, and performing on said signals thus processed, an analog-digital transformation followed by a calculation with the digital values thus obtained, of the instantaneous rotational speed of the transducer.

15. An angular speed measuring device for measuring angular speed, said device comprising:

a transducer rotating at said angular speed;

an oscillator for applying an excitation signal to said transducer to induce a mechanical vibration in said transducer, said mechanical vibration including a parasite component and a useful component;

means responsive to said mechanical vibration for producing an electrical detection signal;

a phase shifter responsive to said excitation signal for producing first and second quadrature signals differing in phase by 90°, operation of said phase shifter being independent of a temperature in which it is operating; and first and second multipliers, identical in temperature response, connected to said phase shifter for receiving said first and second signals, respectively, said multipliers also being connected to said means for producing said electrical detection signal whereby said multipliers produce time-varying signals independent of temperature and having the form $$A/2 \cdot \sqrt{B^2 + C^2} \cdot \cos(\phi + \psi) \text{ and}$$

$$A/2 \cdot \sqrt{B^2 + C^2} \cdot \sin(\phi + \psi),$$

respectively, where A represents the amplitude of the excitation signal, B and C represent parasitic and useful components of the detection signal, $\phi$ represents an initial phase shift between the excitation and detection signals and $\psi$ represents the phase shift due to a Coriolis force and is equal to arc tan C/B.

* * * * *